United States Patent
Himmelmann

(10) Patent No.: US 10,202,178 B2
(45) Date of Patent: Feb. 12, 2019

(54) UNMANNED UNDERWATER VEHICLE PROPULSION SYSTEM INCLUDING AN AC POWER DISTRIBUTION BUS

(71) Applicant: Hamilton Sundstrand Corporation, Charlotte, NC (US)

(72) Inventor: Richard A. Himmelmann, Beloit, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 15/631,163

(22) Filed: Jun. 23, 2017

(65) Prior Publication Data

US 2018/0370607 A1    Dec. 27, 2018

(51) Int. Cl.

| | |
|---|---|
| *B63G 8/00* | (2006.01) |
| *H02K 7/14* | (2006.01) |
| *H02P 9/48* | (2006.01) |
| *B63G 8/08* | (2006.01) |
| *H02K 7/18* | (2006.01) |
| *H02K 11/33* | (2016.01) |
| *H02P 25/02* | (2016.01) |
| *H02P 27/024* | (2016.01) |

(52) U.S. Cl.
CPC ............. *B63G 8/08* (2013.01); *B63G 8/001* (2013.01); *H02K 7/14* (2013.01); *H02K 7/1823* (2013.01); *H02K 11/33* (2016.01); *H02P 9/48* (2013.01); *H02P 25/02* (2013.01); *H02P 27/024* (2016.02); *B63B 2702/04* (2013.01); *B63G 2008/002* (2013.01); *H02P 2207/01* (2013.01)

(58) Field of Classification Search
USPC ............................ 290/7, 9, 17; 114/244, 322
See application file for complete search history.

(56) References Cited

U.S. PATENT DOCUMENTS

| | | | | |
|---|---|---|---|---|
| 1,362,588 | A | * 12/1920 | Allen | ........................ H02J 3/06 |
| | | | | 290/4 A |
| 3,993,912 | A | * 11/1976 | Ekstrom | ................ B63H 23/24 |
| | | | | 290/17 |
| 4,292,531 | A | * 9/1981 | Williamson | ............. B60K 6/26 |
| | | | | 290/14 |
| 4,661,714 | A | 4/1987 | Satterthwaite et al. | |
| 4,743,828 | A | 5/1988 | Jahns et al. | |

(Continued)

FOREIGN PATENT DOCUMENTS

| | | |
|---|---|---|
| EP | 1022218 | 7/2000 |
| EP | 2928068 | 10/2015 |
| WO | 8300851 | 3/1983 |

OTHER PUBLICATIONS

European Search Report for Application No. 18179635.0 dated Oct. 19, 2018.

*Primary Examiner* — Pedro J Cuevas
(74) *Attorney, Agent, or Firm* — Carlson, Gaskey & Olds, P.C.

(57) ABSTRACT

A propulsion system for an unmanned underwater vehicle includes a turbine engine having a rotational output, an electrical generator mechanically connected to the rotational output and electrically connected to an Alternating Current (AC) power bus. A magnitude of an AC output of the electrical generator is independent of rotational speed of the rotational input. An electrical motor connected to the AC power bus, and includes a mechanical output.

20 Claims, 3 Drawing Sheets

(56) References Cited

U.S. PATENT DOCUMENTS

| | | | | |
|---|---|---|---|---|
| 5,652,485 | A * | 7/1997 | Spiegel | F03D 7/0272 318/147 |
| 5,684,690 | A | 11/1997 | Levedahl | |
| 6,188,139 | B1 | 2/2001 | Thaxton et al. | |
| 6,581,537 | B2 * | 6/2003 | McBride | B63G 8/16 114/312 |
| 6,854,410 | B1 * | 2/2005 | King | B63G 8/001 114/244 |
| 7,304,445 | B2 * | 12/2007 | Donnelly | B60L 7/06 180/65.265 |
| 7,353,768 | B1 * | 4/2008 | Jones | B63G 8/001 114/312 |
| 7,544,108 | B2 | 6/2009 | Rzadki et al. | |
| 8,127,704 | B2 * | 3/2012 | Vosburgh | B63G 8/42 114/245 |
| 9,166,510 | B1 | 10/2015 | Himmelmann | |
| 9,857,156 | B1 * | 1/2018 | McKeon | F42B 19/04 |
| 10,000,263 | B2 * | 6/2018 | Farber | B63G 8/001 |
| 10,065,738 | B2 * | 9/2018 | Palmer | F03D 1/04 |
| 2002/0178990 | A1 * | 12/2002 | McBride | B63G 8/16 114/312 |
| 2004/0065247 | A1 * | 4/2004 | Horton | B63G 8/001 114/322 |
| 2006/0061307 | A1 * | 3/2006 | Donnelly | B60L 7/06 318/108 |
| 2009/0241826 | A1 * | 10/2009 | Vosburgh | B63G 8/42 114/330 |
| 2012/0180712 | A1 * | 7/2012 | Vosburgh | B63G 8/42 114/330 |
| 2012/0312221 | A1 * | 12/2012 | Vosburgh | B63G 8/08 114/331 |
| 2015/0283908 | A1 | 10/2015 | Himmelmann | |
| 2016/0023773 | A1 | 1/2016 | Himmelmann et al. | |
| 2016/0036363 | A1 | 2/2016 | Himmelmann | |
| 2017/0077759 | A1 * | 3/2017 | Niizuma | H01F 38/14 |
| 2018/0050797 | A1 * | 2/2018 | Palmer | B64C 39/022 |

* cited by examiner

UNMANNED UNDERWATER VEHICLE PROPULSION SYSTEM INCLUDING AN AC POWER DISTRIBUTION BUS

TECHNICAL FIELD

The present disclosure relates generally to propulsion systems for unmanned underwater vehicles, and specifically to an AC bus based propulsion system for the same.

BACKGROUND

Unmanned underwater vehicles, such as torpedoes, can be deployed from submarines, aircraft, ships, or any similar deployment platform. Once deployed, the unmanned underwater vehicle is propelled towards a target. Historically, unmanned underwater vehicles have been propelled by many different power sources included liquid fuel (such as Otto Fuel) engines, electric motors and batteries, electric motors and fuel cells, chemically heated steam engines, compressed gas engines, and solid rocket motors.

Maximizing an effective range, while also maintaining a sprint speed (maximum high speed) capability, is one goal of unmanned underwater vehicle design, and is impacted by the type of power source utilized to achieve propulsion. The longer the unmanned underwater vehicle's range, the further the deployment platform can be from the target of the unmanned underwater vehicle, protecting the safety of the deployment platform. In addition to the range, a high sprint speed allows the unmanned underwater vehicle to overtake a moving target once the moving target has been alerted to the unmanned underwater vehicle's presence. As is appreciated in the art, most engine configurations trade off effective range for a higher sprint speed, or sprint speed for a higher effective range.

SUMMARY OF THE INVENTION

In one exemplary embodiment a propulsion system for an unmanned underwater vehicle includes a turbine engine including a rotational output, an electrical generator mechanically connected to the rotational output and electrical connected to an Alternating Current (AC) power bus, wherein a magnitude of an AC output of the electrical generator is independent of rotational speed of the rotational input, and an electrical motor connected to the AC power bus, and including a mechanical output.

In another example of the above described propulsion system for an unmanned underwater vehicle the magnitude of the AC output of the electrical generator is at least partially controlled by a magnitude of an excitation current provided to the electrical generator.

In another example of any of the above described propulsion systems for an unmanned underwater vehicle the electrical generator is a voltage controlled generator.

In another example of any of the above described propulsion systems for an unmanned underwater vehicle the electrical motor is an induction motor.

In another example of any of the above described propulsion systems for an unmanned underwater vehicle an electrical output of the electrical generator is directly connected to the AC power bus.

In another example of any of the above described propulsion systems for an unmanned underwater vehicle an electrical input of the electrical motor is directly connected to the AC power bus.

In another example of any of the above described propulsion systems for an unmanned underwater vehicle the AC power bus is a three phase AC power bus.

In another example of any of the above described propulsion systems for an unmanned underwater vehicle the turbine engine is mechanically decoupled from the propulsor.

Another example of any of the above described propulsion systems for an unmanned underwater vehicle further includes a controller communicatively coupled to the electrical generator.

In another example of any of the above described propulsion systems for an unmanned underwater vehicle the controller is a dedicated propulsion systems controller.

In another example of any of the above described propulsion systems for an unmanned underwater vehicle the controller is a general unmanned underwater vehicle controller.

In another example of any of the above described propulsion systems for an unmanned underwater vehicle the propulsion system is disposed in a torpedo.

In another example of any of the above described propulsion systems for an unmanned underwater vehicle the turbine engine is configured to operate at a single speed during all modes of turbine operation.

Another example of any of the above described propulsion systems for an unmanned underwater vehicle further includes a propulsor connected to the mechanical output.

In one exemplary embodiment an unmanned underwater includes at least one fuel storage tank, a propulsion system including: a turbine engine, the turbine engine including a combustor and a turbine, and the combustor being connected to the fuel storage tank, an alternating current (AC) generator connected to the turbine engine such that rotation of the turbine engine drives rotation of the AC generator, an AC bus connected directly to an electrical output of the AC generator, an induction motor including an AC input connected directly to the AC bus, and a propulsor mechanically connected to a rotational output of the induction motor.

Another example of the above described unmanned underwater vehicle further includes a plurality of control electronics, the plurality of control electronics including a propulsion system controller.

In another example of any of the above described unmanned underwater vehicles the AC generator is a voltage controlled AC generator.

An exemplary method for operating an unmanned underwater vehicle propulsion system includes operating a turbine at rotational speed corresponding to a peak turbine efficiency, generating AC electrical energy by translating rotation of the turbine to rotation of a voltage controlled generator, providing the AC electrical energy directly to a motor via an AC bus, and driving a propulsor using the motor.

In another example of the above described exemplary method for operating an unmanned underwater vehicle a voltage of the generated AC electrical energy is independent of a rotational speed of the turbine, and where the voltage of the generated AC electrical energy is at least partially dependent upon an excitation voltage of the voltage controlled generator.

In another example of any of the above described exemplary methods for operating an unmanned underwater vehicle a speed at which the motor drives the propulsor is dependent upon an excitation voltage of the voltage controlled generator.

These and other features of the present invention can be best understood from the following specification and drawings, the following of which is a brief description.

DETAILED DESCRIPTION OF AN EMBODIMENT

Figure 1:
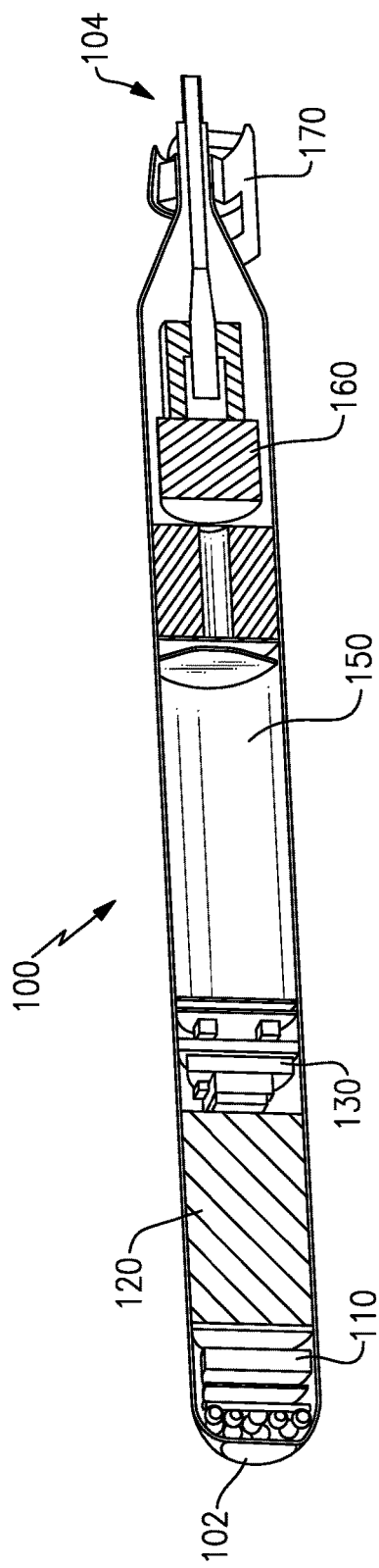
FIG. 1 illustrates a high level schematic view of an exemplary unmanned underwater vehicle including a propulsion system.

FIG. 1 schematically illustrates a cross sectional view of an exemplary unmanned underwater vehicle 100. A forward end 102 of the unmanned underwater vehicle 100 includes a navigation system 110, a payload 120, such as a warhead, and control electronics 130. A mid-section of the unmanned underwater vehicle 100 includes fuel storage tank 150. Alternative example unmanned underwater vehicles utilizing multiple fuel types can include two or more distinct fuel storage tanks, each corresponding to its own fuel type. A rear end 104 of the unmanned underwater vehicle 100 includes a gas turbine engine 160 and a propulsor 170.

Figure 2:
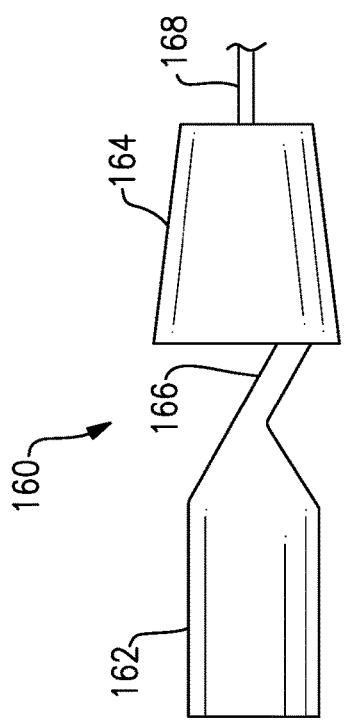
FIG. 2 schematically illustrates an exemplary gas powered turbine for utilization in the unmanned underwater vehicle of FIG. 1.

With continued reference to FIG. 1, and with like numerals indicating like elements, FIG. 2 schematically illustrates an exemplary gas turbine 160, such as could be utilized in the unmanned underwater vehicle 100 of FIG. 1. The gas turbine engine 160 includes a combustor 162 connected to a partial admission axial turbine 164 via a supersonic nozzle 166. Rotational motion generated by the partial admission axial turbine 164 is output via an output shaft 168. In some examples, the output shaft 168 is directly connected to the propulsor 170 (illustrated in FIG. 1), and directly drives rotation of the propulsor 170. In alternative configurations, the output shaft 168 is connected to the propulsor 170 via a geared connection. In the alternative configuration, the geared connection allows a controller, such as the control electronics 130, to adjust the speed at which the propulsor 170 is rotated, thereby controlling the speed of the unmanned underwater vehicle 100. In yet further alternative examples, the output shaft 168 can be connected to alternative systems, such as electrical generators, in addition to or instead of directly to the propulsor 170.

Figure 3:
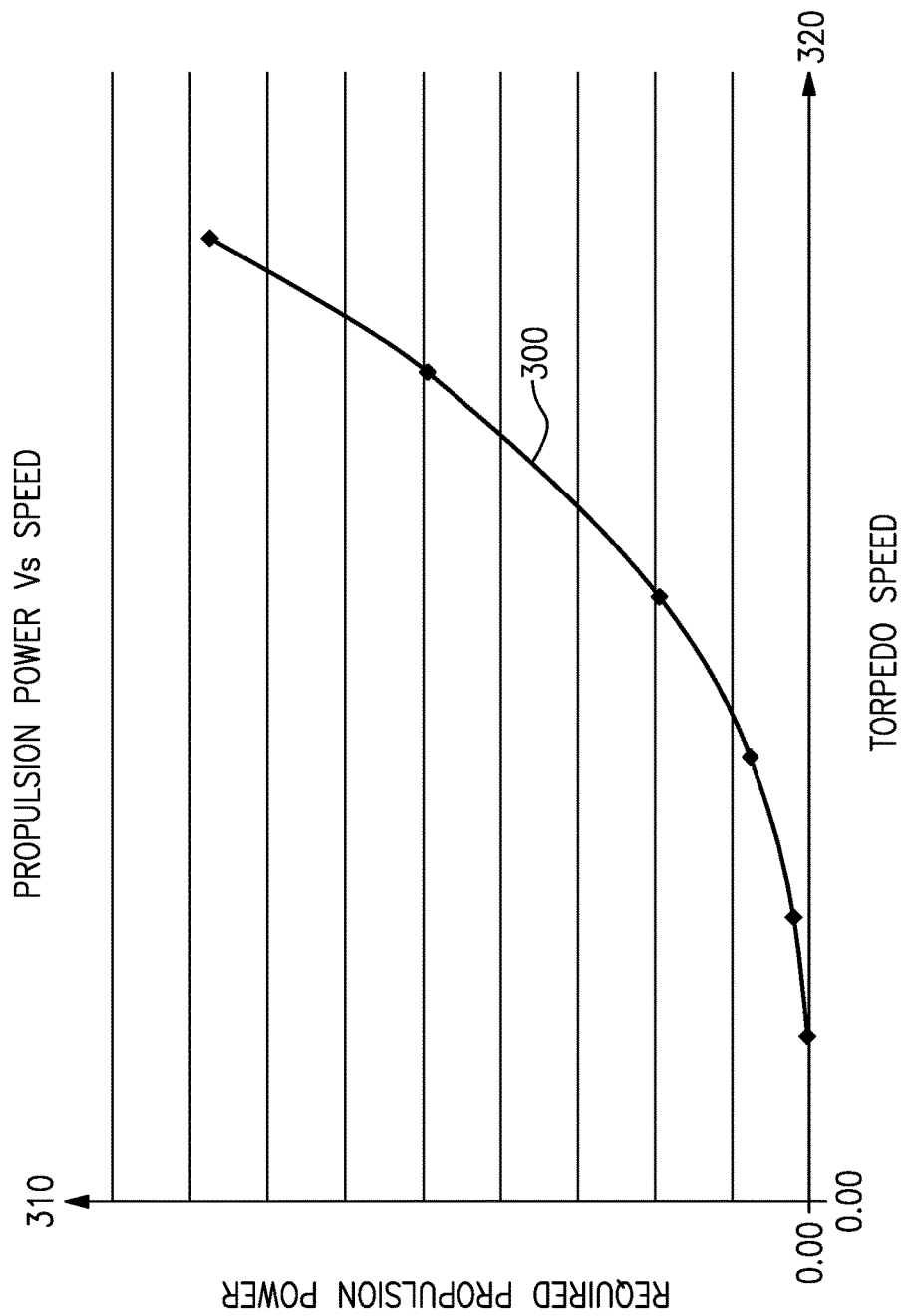
FIG. 3 illustrates a propulsion power vs. speed chart of an exemplary unmanned underwater vehicle.

Once launched, the turbine engine 160 converts chemical energy from the fuel in the fuel tank 150 into mechanical energy by combusting the fuel in a combustor 162 to produce high temperature gas, referred to as a combustion product. The combustion product is expelled through the supersonic nozzle 166 into the partial admission axial turbine 164. The turbine 164 converts the high speed, high temperature, gas into a rotational power which drives rotation of the output shaft 168. The output shaft 168 is connected to the propulsor 170. In the alternative examples utilizing two fuel types, fuel in the first tank 150 and an oxidizer in a second tank are mixed in the combustor 162 and combusted. The control electronics 130 control the operations of the turbine engine 160, as well as any directional controls, or other electronic systems onboard the unmanned underwater vehicle 100. Further, alternative examples utilizing alternative turbine configurations from the described and illustrated partial admission axial turbine 164 can be utilized FIG. 3 illustrates an exemplary propulsion power vs. speed curve 300 of the exemplary unmanned underwater vehicle 100. As can be seen, the curve 300 is non-linear, and the amount of propulsion power (axis 310) required to increase the speed of the unmanned underwater vehicle (axis 320) by a given amount increases exponentially as the current speed of the unmanned underwater vehicle 100 increases. The specific curve 300 illustrated in FIG. 3 is purely exemplary in nature and does not include actual unmanned underwater vehicle propulsion power or speed values. During operation the propulsion power of an unmanned underwater vehicle is related to the unmanned underwater vehicle's forward speed. In order for an unmanned underwater vehicle to operate properly at a very high sprint speed (i.e. with a high maximum velocity), the gas turbine engine 160 has to be capable of providing a very large power level. In order to achieve the exponentially higher power output required for an unmanned underwater vehicle at sprint speed exponentially more fuel must be expended.

Due to the specific power requirements of the unmanned underwater vehicle 100, operation of the unmanned underwater vehicle 100 at slower speeds can increase the range of the unmanned underwater vehicle 100, by requiring less of the fuel to be expended to cover the same distance. Certain combustion engines powered by liquid fuels, such as Otto Fuel, are very efficient at their maximum power design point, allowing for high speed operation, however their efficiency degrades at lower power levels resulting in less fuel saved by operating at low speed than if the combustion engine could maintain a high efficiency while operating at low power. This phenomenon yields a reduction in underwater vehicle range.

Figure 4:
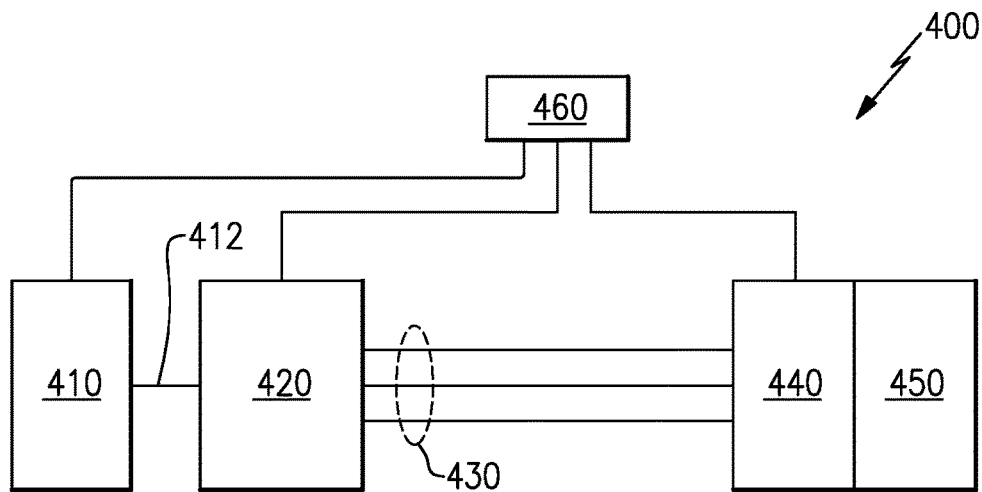
FIG. 4 schematically illustrates an exemplary unmanned underwater vehicle propulsion system including a turbine mechanically decoupled from a propulsor.

In some exemplary unmanned underwater vehicles, the propulsor 170 can be mechanically decoupled from the turbine engine 160. FIG. 4 schematically illustrates a propulsion system 400 for an unmanned underwater vehicle, such as the unmanned underwater vehicle 100 of FIG. 1, including a turbine engine 410 mechanically decoupled from a propulsor 450. The turbine engine 410 includes an output shaft 412 that outputs rotational motion to an electrical generator 420. In some examples, the generator 420 can be integrated into and/or mounted on the turbine 410.

The generator 420 outputs a poly phase Alternating Current (AC) to an AC power bus 430 with the output voltage of the generator 420 being controlled by a controller 460. Also connected to the AC power bus 430 is an induction motor 440. The induction motor 440 converts AC power from the AC power bus 430 into mechanical rotation. The amplitude (voltage) of the AC power from the AC power bus 430 controls the output torque of the induction motor 440. In alternative examples, the induction motor 440 can be replaced with a line start permanent magnet motor, or any other voltage controlled motor configuration. The induction motor 440 is mechanically coupled to a propulsor 450, such as the propulsor 170 of FIG. 1. The propulsor 450 translates the rotational output of the induction motor 440 to forward motion of the unmanned underwater vehicle 100 including the propulsion system 400 according to any known propulsor technique.

Each of the turbine engine 410, the generator 420 and the induction motor 440 are electrically coupled to the controller 460. The controller 460 can be a general controller in the control electronics 130 of the unmanned underwater vehicle 100, a dedicated propulsion system controller, or a combination of the two. The controller 460 controls the operations of the propulsion system 400.

With reference to the generator 420, the exemplary generator 420 is a wound field generator. One of skill in the art will appreciate, however, that any voltage controlled generator could be utilized to the same effect. The output voltage of the wound field generator 420 is controlled by altering an amount of current flowing through exciter stator coils within the generator 420 according to known generator excitation methods. The exciter stator coils produce a magnetic field that induces an alternating current in the exciter rotor assembly due to rotation of the rotor assembly. The alternating current is rectified using a set of rotating rectifiers, thereby producing a DC current on the rotating rotor. The DC current is passed through main field coils to produce a magnetic field on a main generator rotor. The magnetic field induces a current in the main field coils and produces a voltage and a current at the generator's output terminals. By changing the voltage at the exciter stator coils using the controller 460, the output voltage of the generator 420, and thus the voltage on the AC bus 430, is controlled to a desired amplitude.

The generator 420 of FIG. 4 controls the output voltage to the AC bus 430 independently of the rotational speed input to the generator 420 from the turbine engine 410. As the output voltage of the generator 420 is independent of the rotational speed of the turbine engine 410, the turbine engine 410 can be configured to operate at a single rotational speed and can be designed such that the turbine engine 410 achieves peak efficiency at that rotational speed.

With reference to the induction motor 440 specifically, the induction motor 440 is a rotating electric machine that is configured to operate from a poly-phase source of AC voltage. In the exemplary embodiment of FIG. 4, the induction motor 440 is configured to receive a three phase voltage. One of skill in the art will appreciate that alternative numbers of balanced phases could be utilized instead of three phase power with minimal modifications to the propulsion system 400. One exemplary induction motor configuration utilizes aluminum conductor bars placed near the surface of a rotor, in an orientation that is parallel to the axis of rotation of the induction motor. The conductor bars are shorted together at both ends of the rotor by conductive rings.

Within the induction motor 440 are two sets of stator windings that operate together to produce a magnetic field surrounding the armature. The applied rotating magnetic field from the stator windings induces a voltage, and hence a current, in the armature conductors resulting in a magnetic field on the rotor assembly. As the magnetic field on the rotor assembly interacts with the magnetic field on the stator, a tangential force is produced on the armature, which in turn produces a torque on the armature.

The intensity of the torque produced by the induction motor 440 is directly related to the interaction between the rotating magnetic field of the stator assembly, and the magnetic field of the rotor assembly. The intensity of the magnetic field of the rotor assembly is proportional to the intensity of the stators rotating magnetic field. The intensity of the magnetic field of the stator is proportional to the current flowing through the stator windings. This stator current is controlled by the interaction of the stator input voltage, the stator resistance, the stator inductance, and the frequency of the alternating voltage being applied to the induction motor.

In the exemplary induction motor 440, the speed of the propulsor 450 is variable. If the generator output voltage is increased at a given ac bus frequency, the induction motor 440 torque will increase, driving the propulsor 170 to a higher speed. As this happens, the slip ratio (the ratio between the AC bus frequency, and the motor rotor rotational electrical frequency) of the induction motor 440 reduces. The reduction in slip ratio negates some of the effect of increasing the voltage. To compensate, the induction motor 440 increases in speed, but not directly proportional to the increase in voltage. The system controller 130 then automatically further increases the generator output voltage until a desired motor rotational speed is achieved. The induction motor 440 output torque is proportional to both the slip ratio and the ac bus voltage.

As such, the induction motor 440 can be configured to be voltage controlled, input speed controlled, and/or frequency controlled.

In the exemplary propulsion system 400, the induction motor 440 is controlled by maintaining a fixed rotational speed and a fixed frequency of the AC current on the AC bus 430, and adjusting the amplitude of the AC voltage. This is referred to as a voltage controlled mode of operations. The amplitude of the AC voltage output by the generator 420, and thus present on the AC bus 430, is controlled as described above with reference to the wound field generator operations. Alternative control methodologies corresponding to alternative generator types can be utilized to the same affect.

With further regards to the full propulsion system 400 of FIG. 4, the generator 420 is directly connected to the AC bus 430 and the induction motor 440 is also directly connected to the AC bus 430. By directly connecting the generator 420 to the AC bus 430, and directly connecting the induction motor 440 to the AC bus 430, power electronics associated with transmission of, and conversion to/from, Direct Current (DC) are unnecessary. Further, as the torque provided to the propulsion 450 is independent of the rotational speed of the turbine 410, due to the voltage controlled generator 420, the turbine 410 can be operated during all modes of operation of the unmanned underwater vehicle 100 and a battery or other turbine start system is not required.

The omission of power electronics associated with DC current, and the omission of a battery or other stored electrical energy component, allows for a decrease in the overall weight of the unmanned underwater vehicle 100, as well as a decrease in the size of the propulsion system 400. The decrease in the weight, allows the propulsion system 400 to increase the maximum sprint speed, while the decrease in size allows for the fuel storage tank 150 to be increased. Increasing the size of the fuel storage tank further increases the duration that the turbine engine can be operated, thereby increasing the range of the unmanned underwater vehicle.

Figure 5:
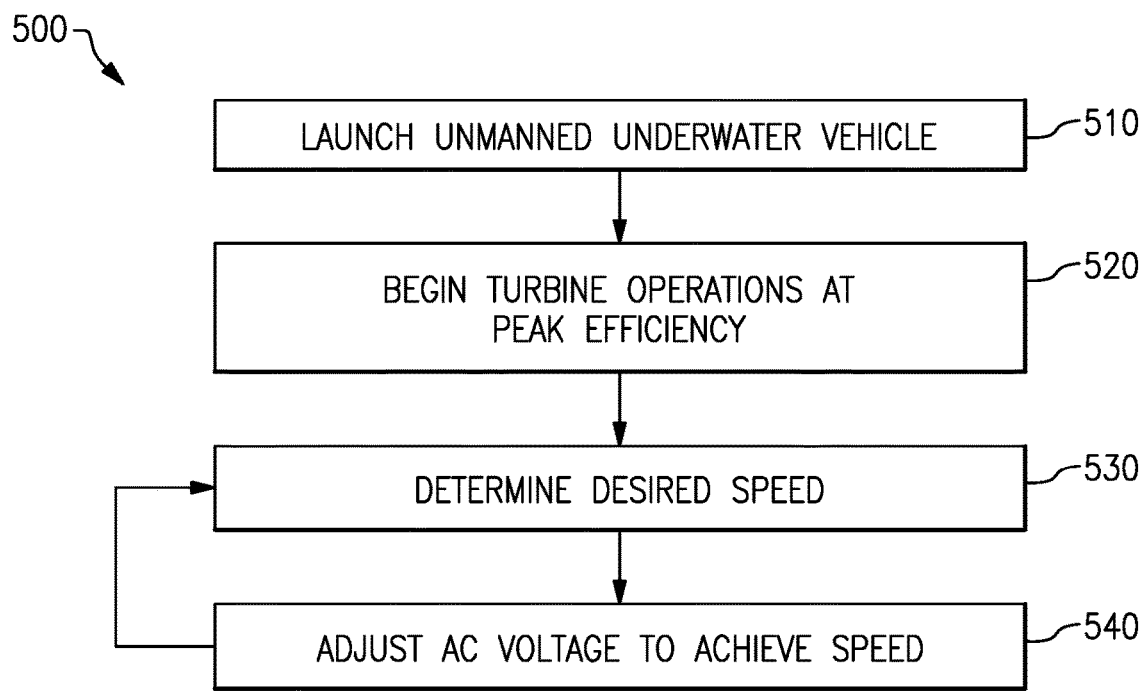
FIG. 5 illustrates operations of the exemplary propulsion system of FIG. 4.

With continued reference to the propulsion system 400 of FIG. 4, FIG. 5 schematically illustrates an exemplary operation 500 of the propulsion system 400. Initially, the unmanned underwater vehicle 100 is launched in a "Launch Unmanned Underwater Vehicle" step 510. Immediately after, or simultaneous with, the launching, the controller 460 causes the turbine engine 410 to begin turbine operations in a "Begin Turbine Operations at Peak Efficiency" step 520. Peak efficiency of the turbine engine 410 is ensured by operating the turbine engine 410 at a constant speed, and ensuring that that speed is the speed at which peak efficiency of the turbine engine 410 is achieved. While operating, the rotation of the turbine engine 410 is converted into AC current, as described above with regards to FIG. 4, and is provided to the AC bus 430.

Once operating, the controller 460 determines what speed the unmanned underwater vehicle 100 should operate at in a "Determined Desired Speed" step 530. The desired speed can be based on water currents, distance to a target, depth of the unmanned underwater vehicle 100, or any other factor. Once a desired speed of the unmanned underwater vehicle 100 has been determined, the controller 460 adjusts the AC voltage output from the generator 420 in an "Adjust AC Voltage To Achieve Speed" step 540. As the torque provided to the propulsor 450 is directly dependent upon the amplitude of the AC voltage provided across the AC bus 430, and the amplitude of the voltage provided form the generator 420 to the AC bus 430 is directly controlled by the excitation voltage, the resultant speed of the unmanned underwater vehicle is controlled by adjusting the excitation voltage of the generator 420.

In some examples, the speed can be controlled via a feedback loop, where the controller 460 provides incremental adjustments to the excitation voltage, and determines if the desired speed has been reached. In alternative examples, the speed can be controlled via consultation against a preloaded table of speeds in the controller. In the alternative example, the controller 460 includes a memory storing a table indicating that if a desired speed is X, then the corresponding excitation voltage is Y.

Once the desired speed has been achieved, the voltage on the AC bus 430 is maintained until conditions change. Once the conditions have changed, the operation 500 returns to the "Determine Desired Speed" step 530, and the operation 500 reiterates.

While described herein within the context of a torpedo propulsion system, one of skill in the art will appreciate that the AC bus based propulsion system can be applied to any unmanned underwater vehicle and is not limited to a torpedo propulsion system. It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A propulsion system for an unmanned underwater vehicle comprising:
   a turbine engine including a rotational output;
   an electrical generator mechanically connected to the rotational output and electrically connected to an Alternating Current (AC) power bus, wherein a magnitude of an AC output of the electrical generator is independent of rotational speed of the rotational input; and
   an electrical motor connected to the AC power bus, and including a mechanical output.

2. The propulsion system of claim 1, wherein the magnitude of the AC output of the electrical generator is at least partially controlled by a magnitude of an excitation current provided to the electrical generator.

3. The propulsion system of claim 1, wherein the electrical generator is a voltage controlled generator.

4. The propulsion system of claim 1, wherein the electrical motor is an induction motor.

5. The propulsion system of claim 1, wherein an electrical output of the electrical generator is directly connected to the AC power bus.

6. The propulsion system of claim 1, wherein an electrical input of the electrical motor is directly connected to the AC power bus.

7. The propulsion system of claim 1, wherein the AC power bus is a three phase AC power bus.

8. The propulsion system of claim 1, wherein the turbine engine is mechanically decoupled from a propulsor, wherein the propulsor is at least partially powered by rotation of the turbine engine.

9. The propulsion system of claim 1, further comprising a controller communicatively coupled to the electrical generator.

10. The propulsion system of claim 9, wherein the controller is a dedicated propulsion systems controller.

11. The propulsion system of claim 9, wherein the controller is a general unmanned underwater vehicle controller.

12. The propulsion system of claim 1, wherein the propulsion system is disposed in a torpedo.

13. The propulsion system of claim 1, wherein the turbine engine is configured to operate at a single speed during all modes of turbine operation.

14. The propulsion system of claim 1, further comprising a propulsor connected to the mechanical output.

15. An unmanned underwater vehicle comprising:
    at least one fuel storage tank;
    a propulsion system including:
       a turbine engine, the turbine engine including a combustor and a turbine, and the combustor being connected to the fuel storage tank;
       an alternating current (AC) generator connected to the turbine engine such that rotation of the turbine engine drives rotation of the AC generator;
       an AC bus connected directly to an electrical output of the AC generator;
       an induction motor including an AC input connected directly to the AC bus; and
       a propulsor mechanically connected to a rotational output of the induction motor.

16. The unmanned underwater vehicle of claim 15, further comprising a plurality of control electronics, the plurality of control electronics including a propulsion system controller.

17. The unmanned underwater vehicle of claim 15, wherein the AC generator is a voltage controlled AC generator.

18. A method for operating an unmanned underwater vehicle propulsion system comprising:
    operating a turbine at rotational speed corresponding to a peak turbine efficiency;
    generating AC electrical energy by translating rotation of the turbine to rotation of a voltage controlled generator;
    providing the AC electrical energy directly to a motor via an AC bus; and
    driving a propulsor using the motor.

19. The method of claim 18, wherein a voltage of the generated AC electrical energy is independent of a rotational speed of the turbine, and where the voltage of the generated AC electrical energy is at least partially dependent upon an excitation voltage of the voltage controlled generator.

20. The method of claim 18, wherein a speed at which the motor drives the propulsor is dependent upon an excitation voltage of the voltage controlled generator.

* * * * *